United States Patent Office 3,262,922
Patented July 26, 1966

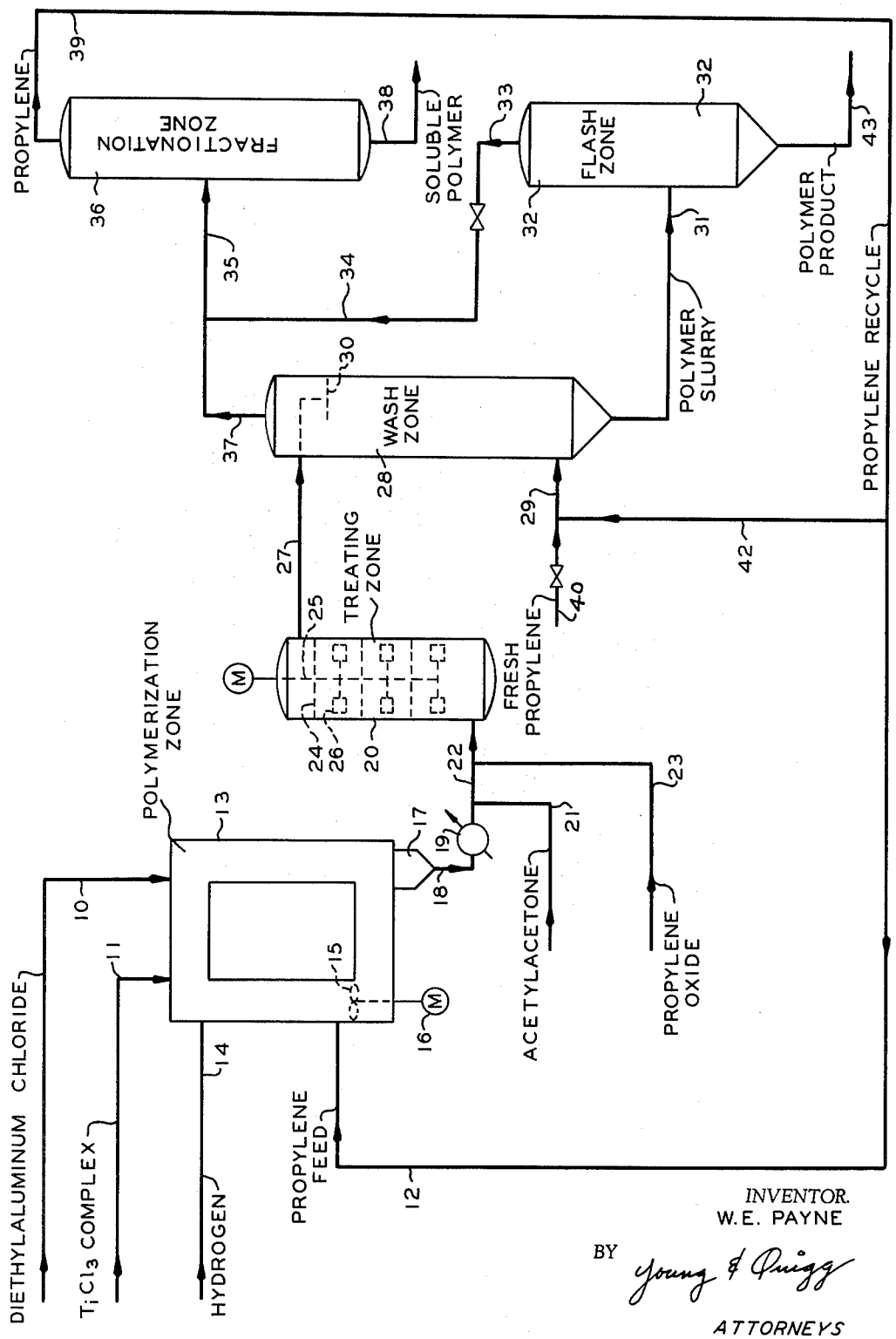

3,262,922
POLYMERIZATION PROCESS
William E. Payne, Bartlesville, Okla., assignor to Phillips Petroleum Company, a corporation of Delaware
Filed Feb. 8, 1963, Ser. No. 257,227
4 Claims. (Cl. 260—93.7)

This invention relates to the production of polymers of olefins. In accordance with one aspect, this invention relates to a process for the purification of monomer feed streams. In another aspect, the invention relates to a process for producing polymers having a low ash content and desirable color and heat stability. In a further aspect, this invention relates to a process for treating the monomer feed and polymers produced in a mass polymerization so as to substantially reduce the ash content of the polymer product and provide a substantially pure monomer feed for polymerization.

The polymerization of olefins, particularly propylene, to high molecular weight resins is well known and it is recognized that highly crystalline polymers are preferred for most practical applications. A well known procedure for the production of polymers of high isotactic content involves polymerization of propylene in the presence of a catalyst or initiator system comprising an organometal, preferably an alkyl aluminum halide compound, and a titanium halide-containing compound, for example, the reaction product of titanium tetrachloride and aluminum. These catalysts are highly sensitive to oxygen, water, and other contaminants and their presence, even in very small amounts in a polymerization system, leads to severe reduction in catalyst activity and can inhibit the polymerization reaction altogether. By suitable adjustment of reaction conditions, selection of catalyst components and other process modifications, polymers having a high isotactic content can be produced.

However, there is generally present in these polymers at least a small amount of soluble amorphous polymer which has a detrimental effect on their physical properties for some applications. In many instances the polymer product is subjected to an extraction step for removal of these materials. As will be apparent, pretreatment of the monomer to remove catalyst poisons and post-treatment of the polymer to remove soluble amorphous fractions introduces into the process expensive and time consuming operations, added equipment, and the like.

Another problem encountered with polymers prepared by the known processes concerns the presence in the product of catalyst residues or ash forming ingredients. The ash content of a product refers to the inorganic substituents which are present in the polymer in unidentified form and which produce ash when the polymer is burned. The presence of these catalyst residues in the polymer adversely affects the color and heat stability of the polymer, as well as its electrical properties.

The present invention is concerned with a process, comprising a combination of steps for producing polymers of olefins in which the prior art operational difficulties discussed above are overcome whereby catalyst poisons in the monomer feed are rendered innocuous while at the same time inactivating the catalyst residues in the polymerization effluent.

Accordingly, an object of the invention is to provide a process for treating polymers prepared in a mass polymerization in order to remove catalyst residues associated therewith.

A further object of this invention is to provide a process for purifying the feed in a polymerization process employing a heterogeneous catalyst or initiator system.

A further object of the invention is to provide a process for the mass polymerization of propylene in the presence of a heterogeneous catalyst system.

Various other objects, advantages and features of the invention will become apparent to those skilled in the art upon consideration of the accompanying disclosure, the drawing, which is a schematic flow diagram illustrating a preferred embodiment of the invention, and the appended claims.

The present invention is particularly concerned with an improvement in a process for polymerizing a mono-1-olefin with a catalyst providing an organometal compound and a metal salt in the substantial absence of an extraneous hydrocarbon diluent and under conditions such that the monomer serves as diluent and a solid polymer in particle form is obtained.

Broadly speaking, in a mass polymerization process wherein a liquid mono-1-olefin is contacted with a catalyst capable of polymerizing the olefin under polymerization conditions so as to form solid polymer and wherein an effluent containing solid polymer, catalyst residue, and liquid olefin is recovered from the polymerization, the present invention resides in the steps which comprise (1) mixing the effluent with a diketone under conditions such that the olefin remains in the liquid phase, (2) contacting the thus-treated effluent with liquid monomer feed for said polymerization under conditions such that the monomer remains in the liquid phase during said contacting, (3) recovering a solid polymer product having a reduced ash content, i.e., substantially free of catalyst residue, and (4) recovering monomer from said contacting and passing at least a portion of same as the monomer feed for the polymerization and the remainder as the washing medium in said contacting.

When operating in this manner, it has been found that the polymer productivity can be substantially increased and at the same time a polymer product can be obtained having a low ash content of 0.01 weight percent or less. Such a polymer meets specification requirements as to color and heat stability and possesses satisfactory electrical properties. Furthermore, the present process does not introduce foreign materials into the system, which would require additional equipment for their separation and recovery. In a commercial operation, this is, of course, a very important advantage. It has been further found, according to the invention, that the catalyst residues present in the effluent from an organometallic polymerization system act as a purification means and are effective for rendering innocuous or scavenging catalyst poisons from the monomer feed.

Thus, according to the invention, all of the olefin feed introduced into the system is first contacted with the polymerization effluent containing catalyst residues which deactivate impurities present in the monomer feed. It has been further found that by countercurrently contacting the polymerization effluent under liquid phase conditions with the monomer feed soluble polymer fractions in the polymerization effluent are effectively removed from the polymerization product, thus yielding a high purity or highly desirable particulate form polymeric product.

The present invention is especially applicable to the purification of the propylene feed passed to a mass propylene polymerization process for the production of particulate polypropylene employing any of the well-known organometallic catalyst or initiator systems active for the polymerization of propylene to a solid particle form polymer. The reaction system to which this invention is particularly applicable is the mass, i.e., no extraneous diluent is employed in the polymerization, in the presence of a catalyst mixture formed by admixing (a) a dialkyl aluminum halide compound with (b) the reaction product of titanium tetrachloride reduced with aluminum, i.e., a titanium trichloride complex.

Although not essential to the conduct of the polymerization, it is often desirable to carry out the polymerization of the invention in the presence of elemental hydrogen. When so operating, hydrogen is added in an amount sufficient to provide from 0.15 to 0.40 mole percent hydrogen in the liquid monomer phase in the polymerization zone. By operating in this manner, the productivity of the catalyst is further increased and certain properties of the polymer, e.g., flexural modulus, are improved.

A better understanding of the invention will be obtained upon reference to the accompanying drawing which shows schematically a preferred embodiment of the invention in which propylene is polymerized in a mass system in the presence of a catalyst system of diethylaluminum chloride (DEAC) and the reaction product of aluminum reduced titanium tetrachloride, the polymerization reaction being effected in liquid propylene as the reaction medium or diluent.

Referring now to the drawing, diethylaluminum chloride by way of line 10, titanium trichloride complex (aluminum reduced $TiCl_4$) by way of line 11, and liquid propylene monomer feed by way of line 12 are introduced into loop polymerization reactor 13. If desired, hydrogen can be introduced separately into reactor 13 by way of line 14 when it is desired to improve productivity of polymer as well as polymer properties. If desired, the hydrogen can be injected into the monomer feed stream at any desired point and introduced into the reactor along with monomer.

The reactor illustrated in the drawing is a loop-type reactor which can comprise one or more loops. Each loop of reactor 13 is composed of at least two straight legs which can be conveniently in the form of elongated pipe sections. The ends of the legs of the reactor are conveniently interconnected by means of L's so as to provide a continuous flow path through the reactor. The reactor is furnished with an impeller 15 which is operatively connected to a turbine motor 16. The operation of the impeller provides motive force for flowing the materials through the loop reactor. The legs of the loop reactor can be encompassed by heat exchange jackets (not shown). Although it is often preferred to employ a loop-type reactor, it is to be understood that the polymerization can be conducted in any suitable known polymerization zone, such as a closed reaction vessel provided with a suitable stirring means.

Since a wide variety of catalyst systems can be employed in the polymerization, it is not intended to limit the invention to any particular catalyst system, e.g., diethylaluminum chloride and aluminum reduced $TiCl_4$ as described in the drawing. Catalyst systems suitable for use in the polymerization are those which are capable of polymerizing a mono-1-olefin in a mass polymerization system and under conditions such that a solid polymer in particle form is produced. Catalyst systems suitable for use can be broadly defined as those comprising an organometal compound and a metal salt.

A particularly suitable catalyst is one which comprises (a) a compound having the formula $R_nMX_m$, wherein R is an alkyl cycloalkyl or aryl radical or combinations of these radicals, such as alkaryl, aralkyl and alkylcycloalkyl, X is hydrogen or a halogen, including chlorine, bromine, iodine and fluorine, M is aluminum, gallium, indium or thallium, $n$ is from 1 to 3, inclusive, $m$ is from zero to 2, inclusive, and the same of $m$ and $n$ is equal to the valence of the metal M, and (b) a halide of a metal of Group IV–B, V–B, VI–B, or VIII. The hydrocarbon radicals which can be substituted for R in the aforementioned formula include radicals having up to about 20 carbon atoms each. Radicals having 10 carbon atoms or less are preferred since the resulting catalyst composition has a greater activity for initiating the polymerization.

Examples of compounds corresponding to the formula $R_nMX_m$ which can be employed include trimethylaluminum, triethylaluminum, triisobutylaluminum, tri-n-butylaluminum, tri-n-pentylaluminum, triisooctylaluminum, tri-n-dodecylaluminum, triphenylaluminum, triethylgallium, triphenylgallium, tricyclohexylgallium, tri-n-butylindium, triethylthallium, diethylaluminum hydride, $CH_3AlCH_2$, $(CH_3)_2AlCl$, $C_2H_5AlCl_2$, $(C_2H_5)_2AlCl$ $(C_4H_9)_2AlBr$, $C_8H_{17}AlI_2$, $(C_3H_7)_2GaF$, $(C_6H_{11})_2GaCl$ (cyclohexane derivative), $(C_6H_5)GaBr_2$ (benzene derivative), $C_{20}H_{41}GaBr_2$, $(C_{14}H_{29})_2GaF$, $(C_6H_5)_2InCl$ (benzene derivative), $C_8H_{17}InF_2$, $(C_6H_{11})InBr_2$ (cyclohexane derivative), 3-methylcyclohexylaluminum dichloride, 2-cyclohexylethylgallium dichloride, p-tolylberyllium iodide, di-(3-phenyl-1-methylpropyl)indium fluoride, 2 - (3 - isopropylcyclohexyl)ethylthallium dibromide, and the like.

The preferred catalyst system employed in the polymerization comprises (1) a dialkyl aluminum chloride or a mixture of same with a dialkyl aluminum iodide and (2) a titanium trichloride complex, the latter preferably being prepared by reduction of titanium tetrachloride in the presence of aluminum. The preferred aluminum reduced $TiCl_4$ can be described as being of the composition $TiCl_3 \cdot XAlCl_3$ in which X is a number in the range 0.1 to 1.0. A convenient method for the preparation of such an aluminum reduced TiCl is by reduction of titanium tetrachloride with metallic aluminum to form a complex having the formula $3TiCl_4 \cdot AlCl_3$. This reaction is generally carried out at an elevated temperature, for example, at a temperature in the range 300 to 650° F., preferably 375 to 450° F.

The amount of catalyst employed in the polymerization of propylene when utilizing the above described catalyst components can vary over a rather wide range. The amount of dialkyl aluminum halide should be at least $1.0 \times 10^{-4}$ gm./gm. of monomer and can be as much as $25 \times 10^{-4}$ gm./gm. of monomer. The amount of titanium trichloride complex employed will generally be in the range between $1.5 \times 10^{-4}$ and $10 \times 10^{-4}$ gm./gm. of monomer. The mole ratio of dialkyl aluminum halide to titanium trichloride complex ordinarily ranges from 1.0:0.005 to 1.0:50.0, preferably 1.0:0.1 to 1.0:10.0. The mole ratio of diethylaluminum chloride to titanium trichloride complex in polymerization reactor 13 is generally in the range between 2:1 and 5:1 and the amount of total catalyst in the reaction zone is about 1 lb./1000 lbs. propylene feed.

The polymerization in reactor 13 is ordinarily carried out at a temperature in the range of 90 to 160° F., preferably 105 to 130° F. when hydrogen is employed in a mass polymerization system with propylene. However, with other systems higher or lower temperatures can be employed if desired. The pressure employed in polymerization zone 13 is sufficient to maintain a liquid monomer phase. The residence time for polymerization ordinarily ranges from 5 minutes to 20 hours or longer, preferably from 1 to 5 hours. Thus, in general the polymerization is conducted under conditions such that solid polymer in particle form is obtained in the polymerization. It has been found that the preferred catalyst as described above, produces a very high percentage of solid polymer with a minimum formation of soluble polymer.

The effluent stream recovered from reactor 13 through drawoff-leg 17 and line 18 comprises solid polymer, catalyst residue, soluble polymer and liquid propylene. The stream usually contains in the range from 25 to 40, preferably 35, weight percent solid polymer. After removal of the effluent through line 18, it is passed through indirect heat exchange means 19 prior to introduction into a lower portion of treating zone 20. In heat exchanger 19, the effluent is heated to a temperature which is slightly higher than the temperature employed in reactor 13. Although it is within the contemplation of the invention to introduce the effluent directly into the treating tank without prior heating, it has been found that improved results as regards catalyst removal are obtained if the temperature maintained in treating zone 20 is slightly higher than the polymerization temperature. In the case of polypropylene, the effluent in line 18 is usually heated to a temperature in the range of 100° to 170° F.

The pressure in treating zone 20 is sufficient to maintain the propylene in the liquid phase, and it is usually substantially the same as the pressure in reactor 13.

A diketone, such as acetylacetone, is introduced by line 21 into the polymerization effluent in line 22 and then conducted along with the polymerization effluent into a lower portion of treating zone 20. If desired, propylene oxide can be introduced into treating zone 20 along with the polymerization effluent and acetylacetone by way of line 23. The propylene oxide scavanges the acid formed by the chelating reaction between the catalyst residue in the polymerization effluent and acetylacetone.

In treating zone or tank 20, the acetylacetone is thoroughly mixed with the effluent from reactor 13. The treating tank depicted in the drawing comprises an enclosed vessel having baffle members 24 disposed in the upper and lower portions of the tank. The baffle members are attached to the walls of the tank and are each provided with a central opening through which the shaft of a stirring means 25 passes. The positioning of the baffle members in this manner in effect divides the contact tank into upper, intermediate and lower sections. Each of these sections is provided with a stirrer 26 which is attached to the shaft of stirring means 25. It has been found that particularly good contact is obtained between the acetylacetone and the effluent from reactor 13 when utilizing this specific structure. However, it is to be understood that it is not intended to limit the invention to any particular contact tank and an enclosed vessel provided with a suitable stirring means can be employed.

The diketone, e.g., acetylacetone, can be introduced into line 22 by itself or it can be added as a solution in a hydrocarbon which is inert to the reactants. However, the acetylacetone is preferably added as a solution, for example, a 1 percent solution, in the propylene monomer. The amount of treating agent added in this manner can range from 1 to 5 times the stoichiometric equivalent, based on the amount of catalyst present. The contact time in tank 20 can vary within rather wide limits, e.g., from 5 minutes to 1 hour. However, it is usually preferred to use a contact time in the range of 20 to 30 minutes.

The diketones suitable for use in the practice of the present invention include alpha-diketones and beta-diketones. These diketones can also be defined as being selected from the group consisting of compounds having the formulas:

(1) 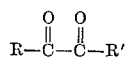

and (2) 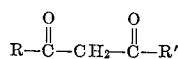

wherein R and R′ are hydrocarbon radicals, such as alkyl, cycloalkyl and aryl. Examples of suitable alpha-diketones include the following:

2,3-butanedione,
2,3-pentanedione,
3,4-hexanedione,
4-methyl-2,3-pentanedione,
3,4-heptanedione,
5-methyl-2,3-hexanedione,
2,5-dimethyl-3,4-hexanedione,
2,2,5,5-tetramethyl-3,4-hexanedione,
1,2-cyclopentanedione,
3-methyl-1,2-cyclopentanedione,
1,2-cyclohexanedione,
bibenzoyl,
bi-2-furoyl,
methylphenylglyoxal,
phenylbenzylglyoxal,
4,4′-dimethoxybenzil, and the like. The following are examples of suitable beta-diketones:

2,4-pentanedione (acetylacetone),
2,4-hexanedione,
2,4-heptanedione,
5-methyl-2,4-hexanedione,
2,4-octanedione,
5,5-dimethyl-2,4-hexanedione,
3-ethyl-2,4-pentanedione,
3,3-diethyl-2,4-pentanedione,
2-2-dimethyl-3,5-nonanedione,
1-cyclohexyl-1,3-butanedione,
5,5-dimethyl-1,3-cyclohexanedione,
1-phenyl-1,3-butanedione,
1-(4-biphenyl)-1,3-butanedione,
1-phenyl-1,3-pentanedione,
1-phenyl-5,5-dimethyl-2,4-hexanedione,
1,3-diphenyl-1,3-propanedione,
1,4-diphenyl-1,3-butanedione,
1-phenyl-2-benzyl-1,3-butanedione,
1-phenyl-3-(2-methoxyphenyl)-1,3-propanedione,
1-(4-nitrophenyl)-1,3-butanedione,
1-(2-furyl)-1,3-butanedione,
1-(tetrahydro-2-furyl)-1,3-butanedione,
and the like.

The treated polymerization effluent is withdrawn from an upper portion of treating zone 20 through line 27 and then introduced into an upper portion of wash zone 28. As shown in the drawing, wash tank 28 comprises an upright elongated cylindrical tank having a substantially uniform cross-section. While this type of structure is preferred it is within the scope of the invention to employ a wash tank, for example, having an enlarged upper portion and a smaller lower portion or other suitable wash towers wherein countercurrent contacting can be effected. Line 29 provides means for introduction of fresh and recycle propylene as wash liquid into a lower portion of wash tank 28. All of the propylene introduced into the system for use as monomer, diluent and wash liquid enters by way of lines 40 and 29 and is first contacted with polymerization effluent in zone 28 to purify same. A splash plate 30 is provided in an upper portion of tank 28 for distributing the polymerization effluent introduced by line 27 substantially uniformly across the cross-section of tank 28. The polymerization effluent entering tank 28 through line 27 flows downwardly therethrough and contacts the liquid propylene in countercurrent flow. The liquid propylene passing upwardly through zone 28 upon contacting downwardly moving solid polymer particles removes catalyst residues, soluble polymer, etc., therefrom and the amount of wash liquid to polymer on a weight basis is generally in the range of 3:1 to 25:1. Actually the upper limit is not critical, being limited only by the capacity of the wash tower. However, as regards the lower end of the range, there must be enough wash liquid to provide good contacting and a "hindered" settling effect in the column.

In wash tower 28, polymer falls downwardly countercurrent to the liquid propylene feed rising therethrough and the catalyst residues contained therein react with impurities present in the propylene feed stream and at the same time propylene soluble materials in the polymerization effluent stream are extracted therefrom by the liquid propylene. The falling polypropylene particles collect at the bottom of tower 28 and are removed therefrom by way of line 31. By the practice of the invention all of the fresh propylene introduced into the system by way of valved line 40 is introduced first into wash tower 28 by way of line 29 prior to further use in the process.

The temperature maintained in the wash tank is generally somewhat lower than that of treating tank 20. This results from the fact that the propylene charged through line 29 is generally at a comparatively low temperature, e.g., 100° F. and below. The pressure maintained in wash tank 28 is sufficient to maintain the propylene in the liquid phase. As mentioned above, the solid polymer in wash tank 28 settles to the bottom of the tank. As the result of this settling the slurry of solid polymer in propylene recovered through line 31 generally contains up to about 50 weight percent solids, e.g., 40 to 50 weight percent. The slurry of polymer in propylene is withdrawn from tank 28 and passed to flash zone 32. In flash tank 32 the pressure can range up to about 65 p.s.i.g., or higher, while the temperature can be in the range of −50 to 15° F. The propylene which flashes off from the slurry in zone 32 is withdrawn from the flash tank through valved line 33 and then passed by way of lines 34 and 35 to fractionation zone 36. Solid polymer in particle form containing a residual amount of propylene is withdrawn from the bottom of flash tank 32 by way of line 43 and passed to further processing as desired.

The overhead stream recovered from wash tank 28 through line 37 contains propylene, soluble polymer, catalyst residues and a small amount of solid polymer. The overhead stream is passed by way of lines 37 and 35 to fractionation zone 36 wherein propylene is separated overhead by way of line 39 and a bottoms stream comprising soluble polymer and other hydrocarbon materials is removed from the base of zone 36 by way of line 38, which can be passed to further processing as desired.

The propylene recovered overhead from zone 36 in line 39 is passed either to polymerization reactor 13 by way of line 12 as monomer and diluent or through line 42 and 29 into wash tower 28 as recycle wash liquid. Sufficient propylene is passed by way of line 12 to reactor 13 to provide the desired amount of propylene needed for polymerization monomer and diluent. The remainder of the propylene in recycle line 39 is passed as wash fluid into the base of wash tower 28.

The temperatures employed in fractionation zone 36 will ordinarily range from about 100° F. top temperature to about 135° F. bottom temperature, and a column pressure of the order of 275 p.s.i.a. The conditions are adjusted so as to effect separation of propylene overhead from the remainder of the material charged to zone 36 by way of line 35.

The polypropylene product produced in accordance with this invention has utility in applications where solid plastics are employed. The polymer can be molded to form articles of any desired shape such as bottles and other containers for liquids. Furthermore, the product can be formed into fibers and pipe by extrusion.

A more comprehensive understanding of the invention can be obtained by referring to the following illustrative example which is not intended, however to be unduly limitative of the invention.

*Specific example*

Propylene is polymerized in a mass polymerization in the presence of hydrogen and utilizing a catalyst consisting of diethylaluminum chloride and a titanium chloride complex (aluminum reduced TiCl$_4$). The complex is prepared by reacting titanium tetrachloride with aluminum and comprised about 5 weight percent aluminum, about 25 weight percent titanium and about 70 weight percent chlorine. The product obtained from polymerization zone is treated with acetylacetone so as to obtain a polymer product having a very low ash content. The polymerization and treatment of the polymer is conducted in equipment similar to that shown in the drawing and the details of the process are described hereinafter in conjunction with the drawing.

A purified feed stream of liquid propylene purified by contacting with the effluent from the polymerization zone is charged to loop reactor 13 through line 12. Diethylaluminum chloride and titanium chloride complex are introduced into the reactor through lines 10 and 11, respectively. Hydrogen is introduced into reactor 13 by way of line 14. The reactor is operated at a temperature of 130° F. and a pressure of 370 p.s.i.a. The residence time of the reactant materials in the reactor is about 3 hours. An effluent stream containing about 25 weight percent solid polymer in particle form, liquid propylene, catalyst residues and soluble polymer is removed from the reactor through line 18.

The effluent stream recovered from reactor 13 is then passed into treating tank 20. Prior to entering the contact tank, a 1 weight percent solution of acetylacetone in propylene is added to the stream. In treating tank 20 the solid polymer is brought into intimate contact with the acetylacetone. The treating tank is operated at a temperature of 120° F. and a pressure of 370 p.s.i.a. After a contact time of about 30 minutes, the treated effluent stream is passed into wash tank 28 by way of line 27. In wash tank 28 the treated effluent stream is contacted in countercurrent flow with fresh and recycle liquid propylene charged to the tank through line 29. About 4 pounds of liquid propylene per pound of polymer is employed as wash liquid. A stream containing liquid propylene, catalyst residues and solid polymer is taken overhead from the wash tank through line 37 and thereafter passed to fractionation zone 36. A slurry containing about 50 weight percent solid polymer in liquid propylene is withdrawn from the bottom of wash tank 28 through line 31 and passed through line 31 to flash tank 32, which is operated at a temperature of −32° F. and 25 p.s.i.a. The propylene flashes off and is removed from the flash tank through line 33 and line 34 and combined with the overhead from treating tank 28 and introduced into fractionation zone 36. Fractionation zone 36 is operated at a top temperature of 111° F., a bottom temperature of 133° F., and a pressure of 275 p.s.i.a. The propylene recovered overhead from zone 36 and 32 in line 39 is passed by way of recycle line 42 to wash tower 28 and reactor 13 for reuse in the process.

A soluble polymer fraction is removed at the base of zone 36 by way of line 38 and a solid polymer product stream is removed from flash zone 32 by way of line 43.

The productivity according to the instant invention is approximately 1050 pounds of polymer per pound of TiCl$_3$ complex, whereas a similar polymerization system not utilizing monomer wash of polymerization effluent and wherein fresh and recovered propylene is passed first to the reactor resulted in a productivity of 700 pounds of polymer per pound of TiCl$_3$ complex. Moreover, the polypropylene product recovered according to the invention contains less than 0.01 weight percent ash.

As will be evident to those skilled in the art many variations and modifications of this invention can be practiced in view of the foregoing disclosure. Such variations and modifications are clearly believed to come within the spirit and scope of the invention.

I claim:

1. In a mass polymerization process wherein a liquid mono-1-olefin is contacted with a catalyst capable of polymerizing said olefin under polymerization conditions so as to form solid polymer and wherein an effluent containing solid polymer, catalyst residues comprising an organo metal compound and a metal salt, and liquid mono-1-olefin is recovered from said polymerization, the steps which comprise:
   mixing said effluent with a diketone chelating agent under conditions such that said olefin remains in liquid phase,
   recovering the thus-treated effluent,
   washing said treated effluent by contacting same in countercurrent flow with fresh liquid mono-1-olefin feed being introduced into the system and recycle liquid mono-1-olefin feed under conditions such that said olefin remains in the liquid phase, thus all of the mono-1-olefin feed being introduced into the system is first contacted with the polymerization effluent containing catalyst residues so as to render innocuous catalyst poisons present in said feed and said feed extracts at least a portion of soluble materials from said effluent, recovering a solid polymer substantially free of catalyst residues from said washing step, and recovering liquid mono-1-olefin from said washing step and recycling at least a portion of same to said polymerization as the sole source of monomer and diluent for said polymerization.

2. The process of claim 1 which includes the steps of:

recovering polymer slurry from said washing step and passing same to a flash zone wherein liquid mono-1-olefin is recovered overhead and solid polymer product as bottoms, withdrawing overhead from said washing a stream comprising mono-1-olefin, soluble polymer, and catalyst residues, subjecting said overhead stream to fractionation to effect recovery of liquid mono-1-olefin overhead, and recycling said recovered mono-1-olefin from said fractionation for reuse in said wash step and as monomer and diluent in said polymerization.

3. In a mass polymerization process wherein liquid propylene is contacted with a catalyst comprising an organometal compound and a metal salt under polymerization conditions so as to form solid polymer in particle form and wherein an effluent containing solid polymer, catalyst residues and liquid propylene is recovered from said polymerization, the steps which comprise:

introducing said effluent into a treating zone and mixing same with acetylacetone, said mixing occurring under conditions such that propylene remains in the liquid phase, withdrawing the thus-treated effluent from said treating zone and introducing said treated effluent into an upper portion of a wash zone, introducing a wash liquid consisting essentially of liquid propylene polymerization feed into a lower portion of said wash zone, said feed including fresh and recycle propylene whereby all polymerization feed is first contacted with the treated effluent containing catalyst residues so as to render innocuous catalyst poisons present in said feed and whereby said feed extracts at least a portion of soluble materials from said effluent, contacting said treated effluent with said liquid propylene in said wash zone in countercurrent flow under conditions such that said propylene remains in the liquid phase, withdrawing from an upper portion of said wash zone a stream comprising propylene, soluble polymer, and catalyst residues and subjecting said stream to fractionation conditions to effect separation of propylene from soluble polymer and catalyst residues therein, recycling said recovered propylene from said fractionation zone to said wash zone as the source of wash fluid and to said polymerization as the sole source of monomer and diluent, and recovering from a lower portion of said wash zone a slurry stream comprising propylene and solid polymer substantially free of catalyst residues.

4. The process according to claim 3 in which said stream recovered from a lower portion of said wash zone is introduced into a flash zone, vaporous propylene is withdrawn from an upper portion of said flash zone and passed to said fractionation zone, and solid polymer in particle form containing a residual amount of propylene is recovered from a lower portion of said flash zone.

References Cited by the Examiner

UNITED STATES PATENTS

| | | | |
|---|---|---|---|
| 2,945,016 | 7/1960 | Benedict | 260—94.9 |
| 2,955,107 | 10/1960 | Lovett et al. | 260—94.9 |
| 2,969,349 | 1/1961 | Stoller | 260—94.9 |
| 2,993,881 | 7/1961 | Geiser et al. | 260—94.9 |
| 3,002,961 | 10/1961 | Kirschner et al. | 260—94.9 |
| 3,056,769 | 10/1962 | Reay et al. | 260—94.9 |
| 3,125,560 | 3/1964 | Rose | 260—94.9 |

JOSEPH L. SCHOFER, *Primary Examiner.*

L. EDELMAN, *Assistant Examiner.*